No. 748,523.

Patented December 29, 1903.

UNITED STATES PATENT OFFICE.

WILHELM PALMAER, OF STOCKHOLM, SWEDEN.

PROCESS OF MANUFACTURING MANURE FROM APATITE.

SPECIFICATION forming part of Letters Patent No. 748,523, dated December 29, 1903.

Application filed December 23, 1902. Serial No. 136,398. (No specimens.)

*To all whom it may concern:*

Be it known that I, WILHELM PALMAER, a subject of the King of Sweden and Norway, and a resident of Stockholm, Sweden, have invented an Improved Process of Manufacturing Manure from Apatite or Similar Mineral Phosphates, (for which I have applied for a patent in Sweden, dated November 10, 1902; in Belgium, dated November 14, 1902; in Norway, dated November 15, 1902; in Finland, dated November 19, 1902, and in France, dated December 2, 1902,) of which the following is a specification.

According to the process described in the United States Patent No. 707,886, August 26, 1902, tricalcic phosphate is obtained, which is due to the fact that the acid solution of mineral phosphate formed at the anode is introduced into the alkaline solution formed at the cathode. In the product thus obtained the phosphoric acid has the same manurial value as in bone-manure. The invention described below refers, however, to the manufacture of bicalcic phosphate, in which the phosphoric acid has the same manurial value as the phosphoric acid of superphosphate soluble in water or citrate solution. For this purpose it is necessary that an alkaline solution should be introduced into an acid solution of the mineral phosphate. This is brought about in the following manner: A solution of a salt of such a composition that during the electrolysis there is disengaged at the anode an acid which forms with lime a soluble salt, while at the cathode there is formed a basic hydrate or a solution of a mixture of such salts is subjected to electrolysis. I prefer to employ a solution of chlorate of sodium, or perchlorate of sodium, or of both these salts when foreign salts—as, for instance, chlorids—may be present in small quantities. During the electrolysis of such a solution there is obtained at the anode an acid solution and at the cathode an alkaline solution, which are drawn off separately. The acid solution obtained is made to act on the mineral phosphate is a separate vessel, dissolving it according to the following equation:

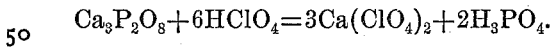

To the acid solution of the mineral phosphate thus obtained the alkaline solution formed at the cathode is added until the acid reaction disappears, or nearly so, bicalcic phosphate being thus precipitated in the form of a microcrystalline precipitate which is separated from the liquid. The following equation sets forth the course of the reaction:

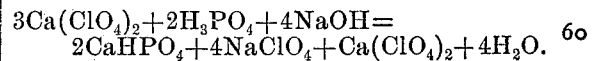

The filtrate, which contains about one-third of the lime dissolved from the mineral phosphate, is mixed with the rest of the cathode solution and carbonic acid is led in, the remaining lime being then precipitated in the form of carbonate and the electrolyte being regenerated. The reaction is elucidated by the following equation:

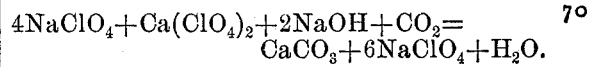

According to this method I always obtain, even from raw phosphates of a low percentage which may contain iron ore, silicate, carbonate, &c., a product of at least thirty-five per cent. of phosphoric acid soluble in citrate solution.

I claim as my invention—

1. The herein-described process of making bicalcic phosphate, consisting in first electrolyzing a solution of a suitable salt which when electrolyzed will disengage at the anode an acid forming with lime a soluble salt and at the cathode a basic hydrate, then subjecting mineral phosphate in a separate vessel to the action of said acid solution obtained at the anode, then adding the solution formed at the cathode to the acid solution of the phosphate to precipitate bicalcic phosphate.

2. The herein-described process of making bicalcic phosphate, consisting in first subjecting a solution containing chlorate of sodium to electrolysis, to obtain an acid solution at the anode and an alkaline solution at the cathode, then causing said acid solution to act on mineral phosphate in a separate vessel, to dissolve it, then adding the solution from the cathode to precipitate bicalcic phosphate.

3. The herein-described process of making bicalcic phosphate, consisting in first subjecting a solution containing perchlorate of sodium to electrolysis, to obtain an acid solution at the anode and an alkaline solution at the cathode, then causing said acid solution to act on mineral phosphate in a separate vessel, to dissolve it, then adding the solution from the cathode to precipitate bicalcic phosphate.

4. The herein-described process of making bicalcic phosphate, consisting in first subjecting a mixture of chlorate, perchlorate of sodium and foreign salts to electrolysis to form at the anode an acid and at the cathode an alkaline solution, then in a separate vessel, causing the anode solution to act on mineral phosphate, then adding the cathode solution to precipitate bicalcic phosphate.

In testimony whereof I have signed my name to this specification in the presence of two subscribing witnesses.

WILHELM PALMAER.

Witnesses:
FREDRIK L. ENQUIST,
A. HELJESTRAND.